United States Patent [19]

Stanley

[11] Patent Number: 4,541,926
[45] Date of Patent: Sep. 17, 1985

[54] PORTABLE WATER CONDITIONER HAVING SEPARATE CONTAINERS FOR DIFFERENT CONDITIONING MATERIALS

[76] Inventor: Bedford F. Stanley, 1650 S. Arizona Ave., Space #72, Chandler, Ariz. 85224

[21] Appl. No.: 632,889

[22] Filed: Jul. 20, 1984

[51] Int. Cl.[4] .............................. C02F 1/28; C02F 1/42
[52] U.S. Cl. ...................................... 210/87; 210/284; 210/291
[58] Field of Search ...................... 210/87, 88, 98, 266, 210/269, 281, 282, 284, 289, 291, 456

[56] References Cited

U.S. PATENT DOCUMENTS

| | | | |
|---|---|---|---|
| 2,334,802 | 11/1943 | Zuckermann | 210/266 |
| 3,509,998 | 5/1970 | Pellett et al. | 210/98 |
| 3,529,726 | 9/1970 | Keenan | 210/266 |
| 3,585,130 | 6/1971 | Gregory | 210/282 |
| 4,196,081 | 4/1980 | Pavia | 210/284 |

Primary Examiner—Ivars Cintins
Attorney, Agent, or Firm—Joseph H. Roediger; Gregory J. Nelson

[57] ABSTRACT

A dual container portable water conditioner for domestic use wherein the containers are removably coupled in a vertical position and include flow diversion means therein to reduce channeling of the conditioning medium.

8 Claims, 3 Drawing Figures

PORTABLE WATER CONDITIONER HAVING SEPARATE CONTAINERS FOR DIFFERENT CONDITIONING MATERIALS

BACKGROUND OF THE INVENTION

The present invention relates to portable water conditioners for domestic use.

The increasing number of studies relating to domestic water quality have generated a correspondingly increasing interest in the provision of low-cost portable water conditioning units for use by the homeowner. While a large rechargeable water conditioning unit has been utilized in many residences throughout the country to combat unpleasant taste, hardness, alkalinity and often times bacteria, much of the water used in the residence is not directly consumed by the occupants and need not be treated. Designed to reduce water conditioning expenses by treating only the water at a single location, the portable unit adapted to be fitted to the kitchen sink within the residence has found a rapidly increasing market.

One such device presently being marketed is described in my U.S. Pat. No. 4,368,123 entitled "Regenerative Counter-top Water Conditioner". This unit is designed to provide in a single container, the water conditioning compounds which perform the ion exchange processes also treat the water to reduce the bacteria count. This type of unit has performed well relying on both anion count and cation exchange resins in combination with silver-activated carbon to both condition domestic water and reduce the bacteria count often found to be relatively high in municipal water systems. These devices are regenerative in that after a certain volume of water has been processed, the unit is reverse-flowed or flushed out in combination with a specific regenerant compound.

These units utilize relatively expensive silver-activated materials to reduce a high bacteria count in the water. However, in applications wherein the domestic water supply is taken from a pure or pretreated source, the bacteria reduction treatment is no longer necessary, and silver-activated materials need not be employed. This is advantageous since the use of silver-activated compounds greatly increases the price of the unit. To this end, it is a primary objective of the present invention to provide a portable water conditioner for domestic use designed to utilize a non-activated carbon containing compound in a separately accessible container. This reduces the cost of water conditioning unit and enables independent regeneration of the ion exchange resins by providing separate containers for the different media. It further enables the relatively low cost charcoal medium having a different active life time to be utilized with the medium being replaced without handling or opening the relatively large ion exchange resin container.

The present invention also simplifies manufacture of the apparatus by employing interchangeable flow diversion means within the different containers to reduce the assembly cost. Also, these diversion means provide a plurality of flow paths within the different containers to more fully utilize the volume of medium employed by reducing channeling of the medium which tends to decrease efficiency of operation. This has the benefit of reducing the number of regeneration cycles for a given volume of treated water passing therethrough.

SUMMARY OF THE INVENTION

A dual container portable water conditioner is provided wherein a first container is provided to include a consumable conditioning medium therein. A larger second container is spaced adjacent thereto and is provided with a regenerative medium, typically a mixture of anion and cation exchange resins. The containers, although of different volumes, each include a tubular member having an appertured disc member located at each end. A diversion means is contained within the top-end disc member of each container. This diversion means provides a number of flow paths for fluid passing therethrough into the corresponding medium.

Below the bottom end disc member is a support means with a retention screen interposed between the support means and the adjacent disc member. The conditioning medium is contained within the tubular member above the combination of apertured disc member and retention screen. Top and bottom closures are located on the respective ends of each tubular member. Each of the closure means is provided with at least one port therein for the passage of fluid. A fluid coupling means interconnects the first and second containers so that fluid introduced at the top of one the containers passes therethrough and is introduced into the top of the adjacent container. Further, support means are provided for maintaining the first and second containers in adjacently spaced upright position for location proximate to a water supply.

The first container, typically one-fifth the volume of the second container, is provided with a first conditioning material which may be carbonized coconut or a similar inexpensive adsorptive material. The second container includes the traditional ion exchange resins utilized successfully in my above-identified U.S. patent to both soften and dealkylize the water flowing therethrough. By utilizing separate containers, and providing flow diversion means in each of the vertical containers, different treatment media may be effectively utilized therein and changed independently of or regenerated separately from each other as necessary for continued operation. Thus, relatively low cost adsorptive material having a relatively short useful life can be utilized in the small container. This container may be made disposable so that replacement can be made independently of conducting a regeneration of the resins in the larger container.

Further features and advantages of the invention will become more readily apparent from the following detailed description of a specific embodiment of the invention when taken in conjunction with the accompanying drawings.

DESCRIPTION OF THE PREFERRED EMBODIMENT

Figure 1:
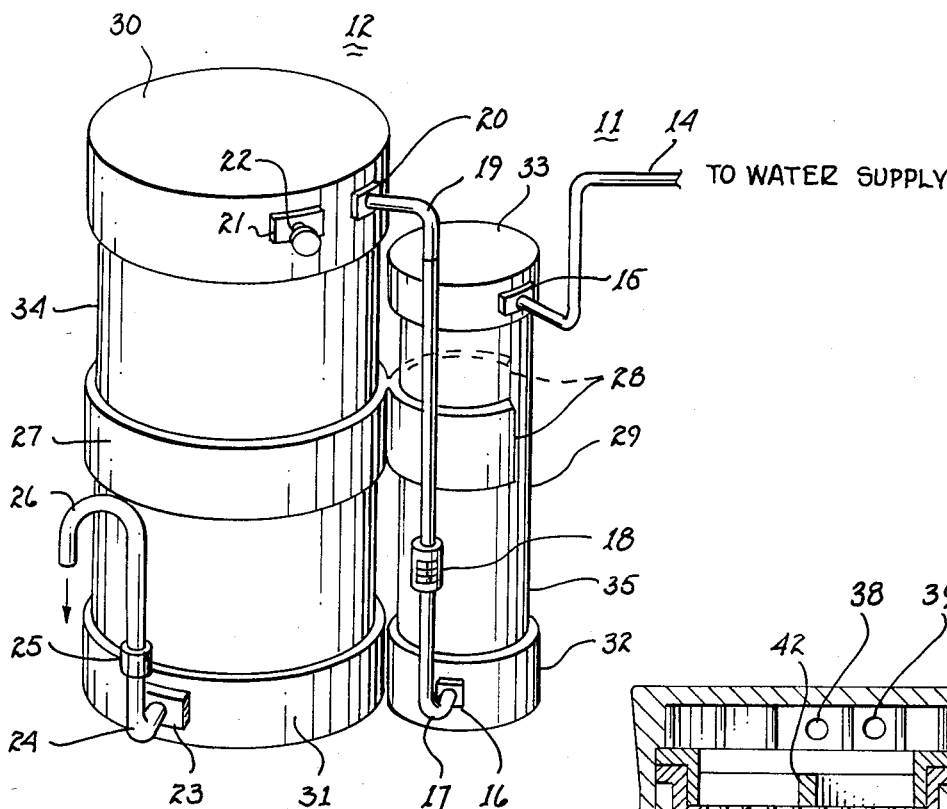
FIG. 1 is a perspective view of one embodiment of the invention showing the first and second containers adjacently spaced in the vertical position.

Referring now to FIG. 1, the present invention is shown including first container 11 and second container 12 spaced adjacent thereto with both containers in the upright or vertical position. The unit is relatively compact and adapted for use in close proximity to a domestic water tap or residential sink. The typical dimensions for the unit are for container 12 to be about five times the volume of first container 11. In one embodiment, the height of container 12 is 16 inches, and the diameter is 4 inches. First container 11 is scaled down in both height and diameter and removably fastened to the second container as shown.

In this embodiment, the first cohtainer 11 is coupled by flexible conduit 14 to the domestic water supply or faucet (not shown) via port 15 formed in the top end cap 33. The tubular member 35 containing the conditioning medium is provided with a bottom end cap 32 having an exit port 16 formed therein. Fluid communication means between the exit port 16 and input port 20 of the second container is shown comprising the flow path of angled conduit 17 which extends upwardly with flow meter 18 contained therein, and right angle coupling elbow 19 to provide connection to the second container.

The larger volume second container 12 is defined by end cap 30, tubular member or sleeve 34 containing the regenerative ion exchange media therein and bottom end cap 31. The bottom end cap is provided with exit port 23 having a rigid angular conduit section 24 extending outwardly therefrom. At the end of conduit 24 is an upright spigot 26 for directing the output flow to accommodate the users needs with a locking mechanism 25 to hold the spigot firmly in place. In operation, the water enters conduit 14 from the external supply flowing in the direction of the arrow and emerges from spigot 26 in a conditioned state to be utilized as desired.

As shown, first container 11 is removably attached to the larger second container 12 by a fastening means formed of band 27 encircling the body or central portion of tubular member 34. The band is provided with outward extensions 28 adapted to receive the first container 11. The material of extensions 28 is flexible and resilient to insure that one container does not significantly move without movement of the other. Both containers are maintained in a vertical position during operation to insure that the water travels through multiple flow paths within the containers.

Figure 2:
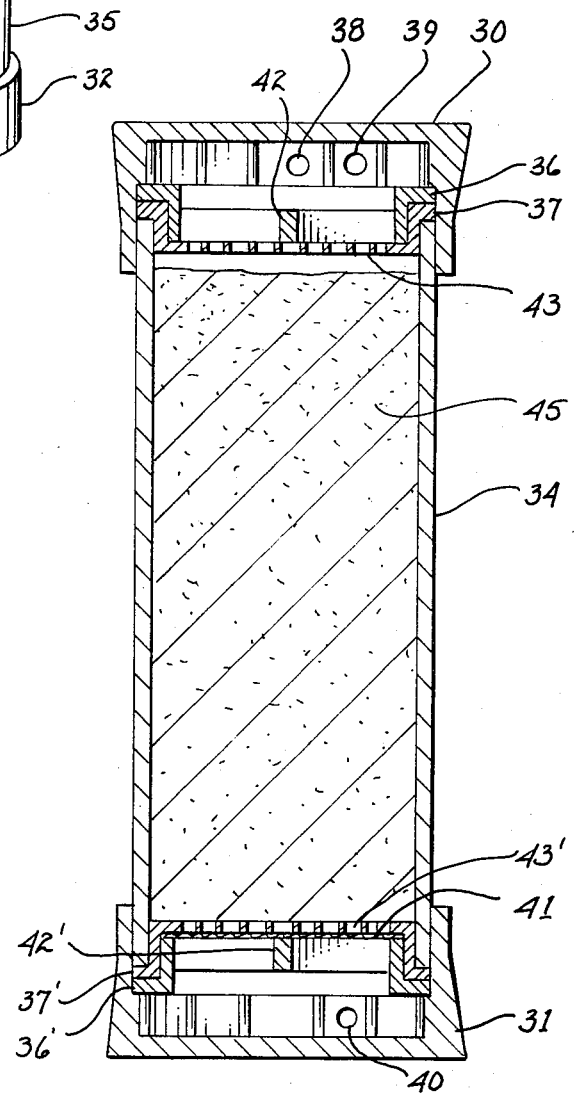
FIG. 2 is a cross-section of one of the containers shown in FIG. 1.

A cross-sectional view of the larger or second container is shown in FIG. 2 wherein tubular member 34 is provided with top and bottom end caps 30, 31 respectively. The interior of the end caps includes a portion of reduced diameter containing inwardly extending protrusions. These protrusions insure a proper fit of the aperture disc member 37 and the mating segmented diversion means 36 placed on the ends of member 34 prior to the addition of the end caps. During assembly the aperture disc member is positioned in the end of the tubular member 34. The diversion means is placed therein and secured by the end cap 30. At the bottom end of the tubular member 34, an additional disc member 37' is similarly positioned. A retaining screen 41 is located adjacent the apertured base of the disc member. This retention screen is held into position by support means contained below the disc member 37'. In practice, one of the diversion means 36 is utilized as the support means 36' shown in FIG. 2. Thus, a combination of apertured disc member and segmented diversion means is utilized at both the top and bottom ends of both the first and second containers in this assembly. This interchangeability substantially reduces the cost of manufacture of the device.

Figure 3:
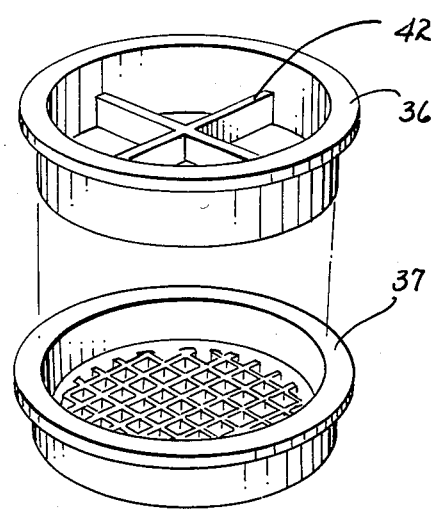
FIG. 3 is an exploded perspective view showing the flow diversion means in combination with the apertured disc member of the embodiment of FIGS. 1 and 2.

In FIG. 3, the combination of the apertured disc member and the segmented diversion means as utilized in the top end of each container is shown. The combination modified by the addition of a retention screen is utilized in the bottom end of each container also. As shown, the circumference of the basal portion of disc member 37 is essentially equal to the inner diameter of tubular member 34 to insure a proper fit therein. The flange extending outwardly at the upper end of the disc member has an outer diameter essentially equal to the outer diameter of the tubular member to permit the placement of the end cap thereover. In addition, the outer diameter of the basal portion of the diversion means 36 is equal to the inner diameter of the disc member to permit the diversion means to be placed therein. Similarly, the outer diameter of the flange of diversion means 36 is essentially equal to the outer diameter of the tubular member. During operation, these two elements serve to provide multiple flow paths for the water as it passes through the medium 45 contained in the tubular member 34.

The diversion means includes internal cross members 42 seen in FIGS. 2 and 3 which cause incoming water from the input port in the appropriate end cap to be divided into large area quadrants. As the initial flow into the container encounters the conditioning medium, the flow rate of water through the medium is at a lower initial rate so the end cap becomes filled due to pressure from the water supply. The diversion means has been found to promote the flow of water through all of the apertures underlying the different quadrants thereby improving the passage of water through a large volume of the underlying medium. Thus, tendency of the water to rapidly develop a limited number of channels therethrough is reduced and the efficiency of operation is improved due to the combination of diversion means and apertured disc member. The containers are to be maintained in a vertical operating position in order for the benefits of this combination to be fully realized. Operation in a horizontal position has been found to result in the rapid development of channels in the conditioning medium thus quickly reducing the efficiency of the apparatus. This is believed to result from the continued movement of the conditioning medium particles within the container during operation thereby resulting in a reduced volume which permits channeling to take place rather quickly.

The band 27 is located about the central portion of tubular member 34 of the second container and its extensions removably secure the first container in an adjacent upright position. The attached dual containers provide a stable upright apparatus which withstands the forces generated by pressure surges from turning the water supply on and off. Since the extensions permit the first container to be withdrawn, the detachment of conduit 14 from the water supply and the separation of conduit 17 from the coupling elbow 19 enables the first container to readily be separated from the rest of the apparatus. Consequently, the user can remove an end cap and remove the carbon conditioning medium therefrom. The medium in first container 11 is utilized for adsorptive purposes in combination with the conventional ion exchange resins contained in the second container 12.

A suitable low cost adsorptive medium found useful in the present embodiment is coconut carbon; however other adsorptive media can be utilized if desired. The present unit is intended to be utilized to improve the water quality from relatively bacteria-free sources so that the high cost silver-activated carbon media may be, but are not intended to be employed with the present invention. The use of a low cost adsorptive medium enables the container to be emptied periodically, and the medium replaced rather than regenerated. The more expensive larger volume ion exchange resins can be independently recharged by coupling the water supply to the recharging part 21 provided in end cap 30. During operation, the recharging port is closed by threaded member 22. However during recharging, the coupling elbow 19 is removed from input port 20 and threaded member 22 is inserted therein to be sure that the fluid travels through the conditioning medium in container 12 and exits through spigot 26. The parts 20 and 21 are shown in the cross-sectional view of FIG. 2 as the openings 38 and 39 in end cap 30.

The units are preferably constructed of rigid plastic with the bottom end caps securely attached to the tubular members. The top end caps are removably attached to permit access to the media contained therein, and frequent replacement of the low cost adsorptive medium in container 11. In normal operation the use of coconut carbon in container 11 has been found to require three changes for every recharge of the medium in container 12. Since the water quality varies greatly from location to location, only general guidelines can be given the user who must then determine by actual operation the relative frequencies of replacement and recharge for his location. To aid the user, a flow meter 18 which provides a visual readout of the number of units of water passing through the apparatus is located in conduit 17 between the containers.

Although the foregoing description has referred to the smaller first container being connected directly to the water supply, the position of the containers in the apparatus can be reversed. Further, it is recognized that many variations and modifications of the described embodiment may be made without departing from the scope of the invention as claimed.

What is claimed is:

1. A dual container portable water conditioner of the type wherein a consumable conditioning medium is included within a first container and a regenerative medium is included within a second container, said conditioner comprising:
    (a) a first container which includes:
        i. a first tubular member including a longitudinal axis and having top and bottom ends;
        ii. first and second apertured disc members each placed in the top and bottom ends respectively of said member;
        iii. diversion means including a plurality of radial members forming arcuate segments therein, said means being contained within said first disc member for diverting fluid passing therethrough into a plurality of flow paths.
        iv. support means including a plurality of radial members forming arcuate segments therein, said means being contained beneath said second disc member;
        v. a retention screen interposed between the support means and said second disc member;
        vi. top and bottom closure members each located on the respective end of said first tubular member, each of said closure means having a part therein for the passage of fluid in a direction normal to the axis of the tubular member, at least one of said closure members being removably affixed to said tubular member; and
        vii. a first conditioning material contained within said tubular member above said retention screen;
    (b) a second container having a larger volume than said first container which includes:
        i. a second tubular member including a longitudinal axis and having top and bottom ends;
        ii. third and fourth apertured disc members each placed in one of said ends of the second tubular member;
        iii. diversion means including a plurality of radial members forming arcuate segments therein, said means being contained within said third disc member for diverting fluid passing therethrough into a plurality of flow paths;
        iv. support means including a plurality of radial members forming arcuate segments therein, said means being contained beneath said fourth disc member;
        v. a retention screen interposed between the support means and said fourth disc member;
        vi. top and bottom closure members each located on the respective end of said second tubular member, each of said closure means having a port therein for the passage of fluid in a direction normal to the axis of the tubular member; and
        vii. a second conditioning material contained within said second tubular member above said retention screen;
    (c) fluid coupling means interconnecting said first and second containers for the passage of fluid therethrough; and
    (d) means for maintaining said first and second containers in adjacently spaced upright position.

2. The water conditioner in accordance with claim 1 wherein the diversion means of said first and second containers is dimensioned to fit within said first and third disc members respectively.

3. The water conditioner in accordance with claim 1 wherein said diversion means for the first and second containers are interchangeable with the support means for the respective containers.

4. The water conditioner in accordance with claim 3 wherein said first conditioning material comprises an adsorptive carbonized material.

5. The water conditioner in accordance with claim 4 wherein said second conditioning material comprises regenerative ion exchange resinous material.

6. The water conditioner in accordance with claim 5 wherein said resinous material includes an anion exchange resin and a cation exchange resin.

7. The water conditioner in accordance with claim 5 further comprising flow monitoring means connected in fluid communication with said first and second containers to provide an indication of fluid volume passing therethrough.

8. The water conditioner in accordance with claim 7 wherein said second container includes a port for regeneration of the conditioning material therein.

* * * * *